Mar. 3, 1925.

T. I. DUFFY

VEHICLE SPRING

Filed March 14, 1919 — 4 Sheets-Sheet 1

1,528,472

Witness: Harry S. Guether

Inventor: Thomas I. Duffy
by William L. Hall, Atty.

Mar. 3, 1925.

T. I. DUFFY

VEHICLE SPRING

Filed March 14, 1919    4 Sheets-Sheet 3

1,528,472

Witness:
Harry S. Gaither

Inventor:
Thomas I. Duffy
by William L. Henry

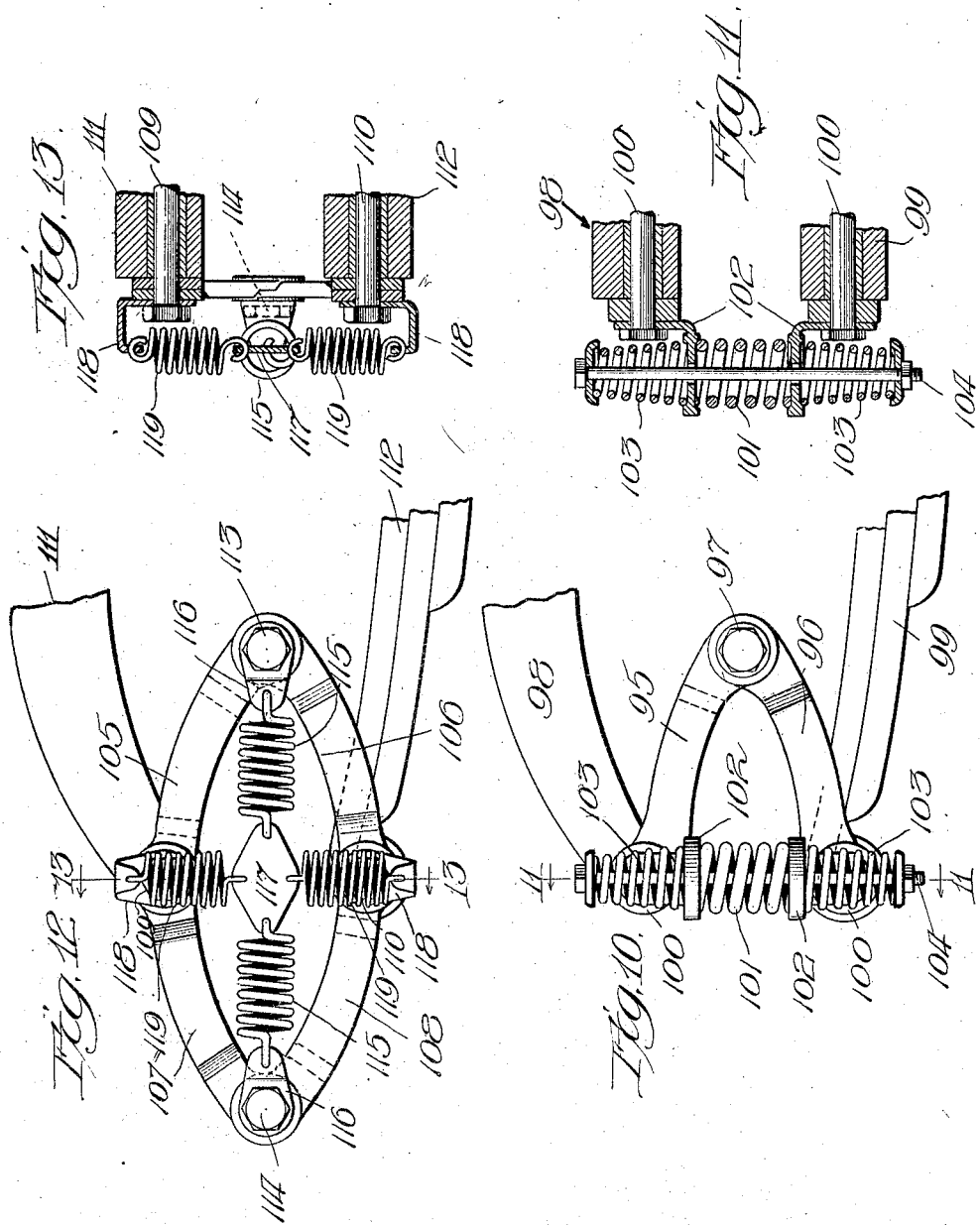

Patented Mar. 3, 1925.

1,528,472

UNITED STATES PATENT OFFICE.

THOMAS I. DUFFY, OF CHICAGO, ILLINOIS.

VEHICLE SPRING.

Application filed March 14, 1919. Serial No. 282,563.

*To all whom it may concern:*

Be it known that I, THOMAS I. DUFFY, a citizen of the United States, and a resident of Chicago, in the county of Cook and State of Illinois, have invented certain new and useful Improvements in Vehicle Springs; and I do hereby declare that the following is a full, clear, and exact description thereof, reference being had to the accompanying drawings, and to the characters of reference marked thereon, which form a part of this specification.

This invention relates to improvements in springing for vehicles. It refers to a novel auxiliary spring for vehicles designed to cooperate with the regular springing elements to absorb the minor road shocks and also to assist the main springing elements to take the more severe shocks. It also refers to an anti-recoil device which is constructed and arranged to control the recoil action of the springing. It also refers to a novel shackle or linkage device which connects the ends of the springing elements and which maintains the springing elements in lateral alignment, permits free relative vertical movement of said springing elements and avoids frictional binding of the connecting or linkage members.

An object of the invention is to produce an exceedingly simple and effective linkage and auxiliary spring device for the purpose specified, so constructed and arranged as to transmit the load from one springing element to the other in a manner to carry the load freely on the auxiliary springs, and by which is provided means to maintain lateral alignment of the springing elements, while permitting vertical flexibility without frictional impedance to free spring action.

Another object of the invention is to provide a connection between the linkage elements of the device and the springing elements which permit adjustment of the linkage elements to various springs that have different connecting points with the auxiliary spring device.

Another object of the invention is to provide a universal linkage and auxiliary spring device that is universally capable of adaptation to different types of vehicle springing.

A further object of the invention is to combine in a very simple manner an auxiliary spring and anti-recoil spring which are held in cooperative action and guided in movement by common retaining and guiding means.

A further object of the invention is to produce an auxiliary spring device for the purpose set forth which is symmetrical to the main spring when applied and which presents a neat appearance on the vehicle.

Other objects of the invention are to improve and simplify auxiliary spring devices for the general purposes set forth, and the invention consists in the combination and arrangements shown in the drawings and described in the specification, and is pointed out in the appended claims.

In the drawings,

Figure 8 is a detail of a friction joint hereinafter described.

Figure 9 is an elevation of a spring washer used in said friction joint.

Figure 10 illustrates a modification of the linkage.

Figure 11 is a section on the line 11—11 of Figure 10.

Figure 12 is a fragmentary side elevation of a further modification.

Figure 13 is a section on the line 13—13 of Figure 12.

In the following description I have shown my invention as applied to a semi-elliptical spring that is connected to the vehicle body through the usual dumb irons or frame extensions, and as applied to a three quarter elliptical spring, embracing a lower semi-elliptical spring which is attached to the chassis and an upper scroll spring that is attached to the body and also applied to a semi-elliptic spring mounting without the fixed frame extension. In all forms of adaptation the linkage or auxiliary spring device is adapted to be used with regular vehicle springs and is adapted to the springing elements to take the place of the usual shackles heretofore connecting said elements and may be termed a universal device. The term "springing elements," therefore, is intended to include any form of vehicle springing which embodies an element that is carried by and connected to the chassis and another that is carried by and connected to the body, whether or not one or both said elements be spring or resilient structures.

First, referring to the device shown in Figures 1, 2, and 3, 10 designates a semi-elliptical load spring element that is adapted to be connected to the chassis in the usual way, and 11 designates a curved, rigid dumb iron or frame extension which is connected to the body of the vehicle and to the load spring element 10.

Figure 1:
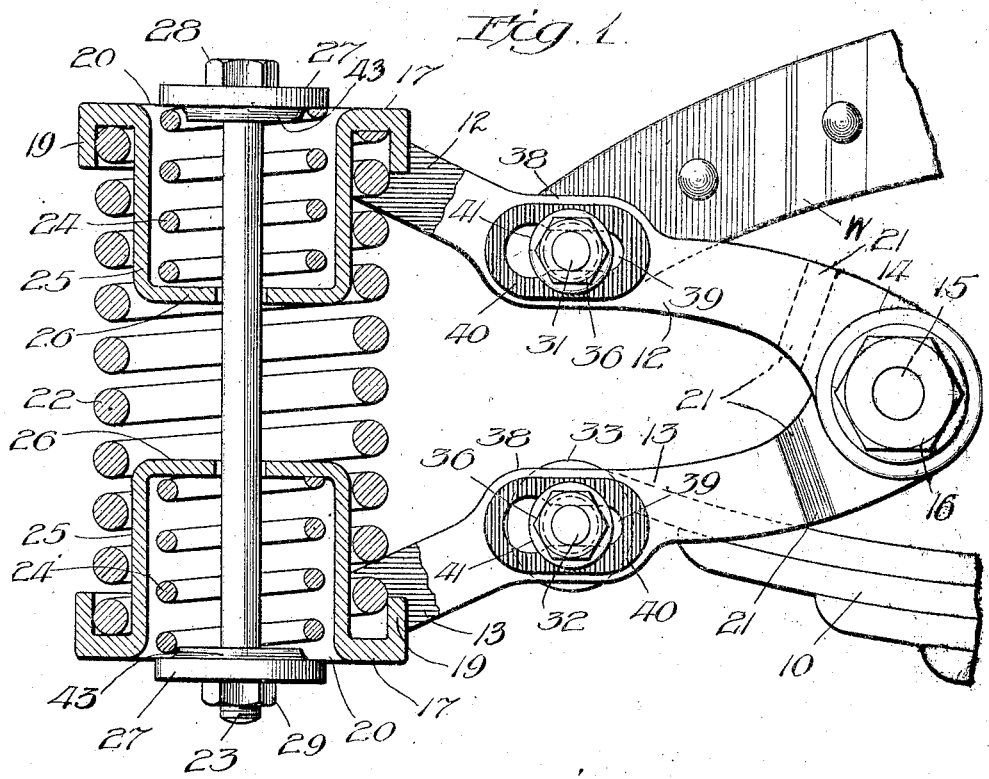
Figure 1 is a side elevation, with parts in section, showing one form of my invention.
Figure 2:
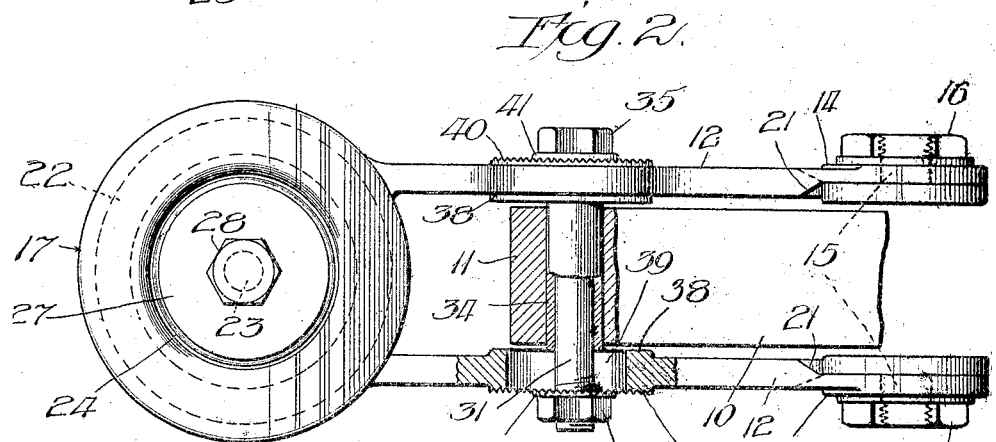
Figure 2 is a top plan view thereof, with parts thereof shown in section.

Arranged at each side of the spring elements 10 and 11 is a pair of levers, each consisting of an upper lever arm 12 and a lower lever arm 13. The levers of each pair are formed at their inner ends to provide enlargements or heads 14, 14, one of which is formed with an integral hinge stud 15 that extends through an aperture of the other head and therebeyond to receive a nut 16. In some instances said hinge connection may constitute a simple hinge to connect the levers, and in other structures said hinge connection may embody friction means to control the shock or recoil action of the main spring or springs, as will hereinafter appear. As shown in Figures 1 and 2, the shock and recoil control embrace spring elements between the outer ends of the levers. In Figures 8 and 9 are shown a structure wherein the recoil control embraces friction means.

As shown in Figures 1 and 2, the outer ends of the upper and lower levers of the pairs are formed to provide oppositely facing spring seats 17 that are formed with spring retaining flanges 19 and with central openings 20, herein shown as of considerable diameter. The said levers 12 and 13 are of oblong cross section, being wider in vertical dimension and are offset at 21 so as to permit the heads or hubs 14 of the levers to sidewise overlap while bringing the main bodies of the levers of each pair between said heads and the spring seats in the same vertical planes, as clearly shown in Figures 1 and 2. The said levers and their heads are so spaced and dimensioned as to be wholly outside the springing members 10 and 11 so as not to clash therewith when the springing is heavily loaded.

Interposed between said spring seats is a coil spring 22. Said spring seats may be tied or confined from spreading apart by any suitable means, a tie bolt 23 being herein shown. The spiral or coiled spring 22 constitutes the auxiliary spring for absorbing the minor road shocks and the lighter loads absorbed by the spring 22 without deflecting the spring 10.

The auxiliary springs are associated with means to control the recoil of the spring 10. Such anti-recoil means may be spring means or friction means, both being herein shown. As shown in Figure 1 of the drawings, said spring 22 and the spring seats are associated with anti-recoil springs which control the recoil action of the main springing elements. In said Figure 1 there are two of such anti-recoil springs 24 of spiral formation. They are disposed within the auxiliary spring 22, one at each end thereof, and surround the tie bolt 23. Said anti-recoil springs are seated in cups 25 which may be made integral with the spring seats 17 or may, if desired, be made separate therefrom and suitably interlocked thereto. The anti-recoil springs 24 are interposed between the ends 26 of said cups and washers or discs 27 that are apertured for the passage of the tie bolt 23 and are seated one against the head 28 of said tie bolt and the other against the nut 29 thereof. The cup bottoms 26 are centrally apertured for the free passage of the tie bolt. The tie bolt 23 is thus common to both the auxiliary and anti-recoil springs and serves to hold the springs of both kinds under normal compression.

In the form of device shown in Figures 1 and 2, the upper levers 12 of the two pairs are made integral with or fixed rigidly to the upper spring seat 17 while the lower levers of said two pairs are likewise made integral with or fixed rigidly to the lower spring seat 17, although this construction may be varied, as will be hereinafter described.

The upper and lower spring seats and associated pairs of levers, which are hinged together at their inner ends by the hinge studs 15, with the auxiliary spring 22 interposed and retained between the spring seats 17, together with the anti-recoil springs 24, 24, when the latter are employed, constitute the active elements of the auxiliary spring device which is constructed and adapted to be connected between the upper and lower main springing elements 11 and 12, respectively, in a manner to give free swinging movement to said levers 12 and 13 toward and from each other about their pivots 15. The said connections of the main springing elements with said levers lie at points between the hinge studs 15 and the auxiliary spring so that, in the construction shown in Figures 1 and 2, the spring 22 is compressed when the springing elements 10 and 11 are moved relatively one towards the other. The means for connecting the said levers 12 and 13 to the upper and lower springing elements 11 and 10 are pivot means and are made as follows:

31 and 32 designate pivot bolts which, respectively, extend transversely through an apertured bearing in the end of the dumb iron or body extension 11 and the eye 33 of the spring 10. Said pivot bolts 31 and 32 are shown as extending through spacer sleeves 34 within the apertures of the dumb iron and spring eye, which abut at their ends against the corresponding levers of the two pairs and cooperate with the heads 35 and nuts 36 of the pivot bolts to confine the levers to the springing elements without causing their contacting faces to frictionally bind. Obviously a bolt of the full diameter of the sleeve 34, with its ends reduced to extend through the levers would answer the same purpose.

As a further improvement, means are provided whereby the levers may be adapted to springing elements, the apertures of which may be out of proper alignment with each other, so that when the auxiliary spring device is attached to the springing elements it will lie at the proper angle with respect to the springing elements and to the general contour of the body to properly dress the spring mount to the lines of the vehicle. For this purpose the said levers are provided between their ends and at their points of pivot with the springing elements with straight portions 38 that are cut away to provide slots 39 through which the pivot bolts 31 and 32 extend. Preferably and as shown, the said slots 39 are enlarged at their ends to permit the passage therethrough of the tubes 34 (or alternately the enlarged parts of the bolt). With this arrangement it will be observed that either the upper or lower levers of the two pairs of levers may be longitudinally shifted relatively to their pivots so as to vary the angle of the axis of the auxiliary spring relatively to the vertical to give the spring 22 the desired pitch. As a means for holding the levers in their adjusted positions, the outer faces of said levers may be roughened or serrated as at 40 to be engaged by the correspondingly roughened or serrated inner faces of washers 41 that are interposed between said roughened faces 40 and the nuts and heads, respectively, of the pivot bolts 31 and 32.

The operation of the device will be apparent from the foregoing. In installing the spring device, the auxiliary spring 22 is placed under compression between the spring seats 17, which normal compression is maintained by the weight of the body transmitted through the dumb iron or frame extensions 11 and the upper levers 12. The anti-recoil springs 24 are assembled under compression which is considerably less than that of the auxiliary spring 22, the compression of the anti-recoil springs 24 being adjustably effected by the screw threaded tie bolt 23 acting against the washers 27. It will be observed that the washers 27 are of less diameter than the openings 20 in the spring seats so that said washers may pass into and out of the cups 25; and said washers may be provided with guide flanges 43 to enter the anti-recoil springs 24 and to center the washers and bolts relatively thereto. This construction provides means to maintain the parts central with respect to each other while avoiding frictional binding which would tend to dampen the action of the springs.

With the parts assembled and installed on the upper and lower springing elements, as described, it will be observed that the load of the body rides primarily on the spring 22; and said spring is made of such strength as to carry moderate loads and to absorb moderate road shocks without flexing the spring 10. Heavier loads and severer road shocks are transmitted through the spring 22 to the spring 10, whereupon said spring 22 and spring 10 coact to absorb the severer road shocks. The action of the anti-recoil springs 24 is such that said springs will be maintained under compression throughout the range of movement of the springing elements and auxiliary spring so as to prevent the tie bolt from being loosened to cause it to rattle. When the flexing stress is released from the spring 10 so as to permit said spring to resume its normal curved position from its elongated position, the springs 24 are brought into action to prevent the spring seats 17 being suddenly forced apart to thereby prevent objectionable recoil due to the action of the springs 10 and 22. By reason of the fact that the anti-recoil springs are under compression at all times, even when the springing is most heavily loaded, it will be observed that the action of the anti-recoil springs to prevent rebound under the restoring action of the springs is a gradual one. Therefore, the anti-recoil function of the device is delicate and without abrupt shock.

Figure 3:
Figure 3 is a detail of one of the lever arms, showing one of the adjusting slots.
Figure 4:
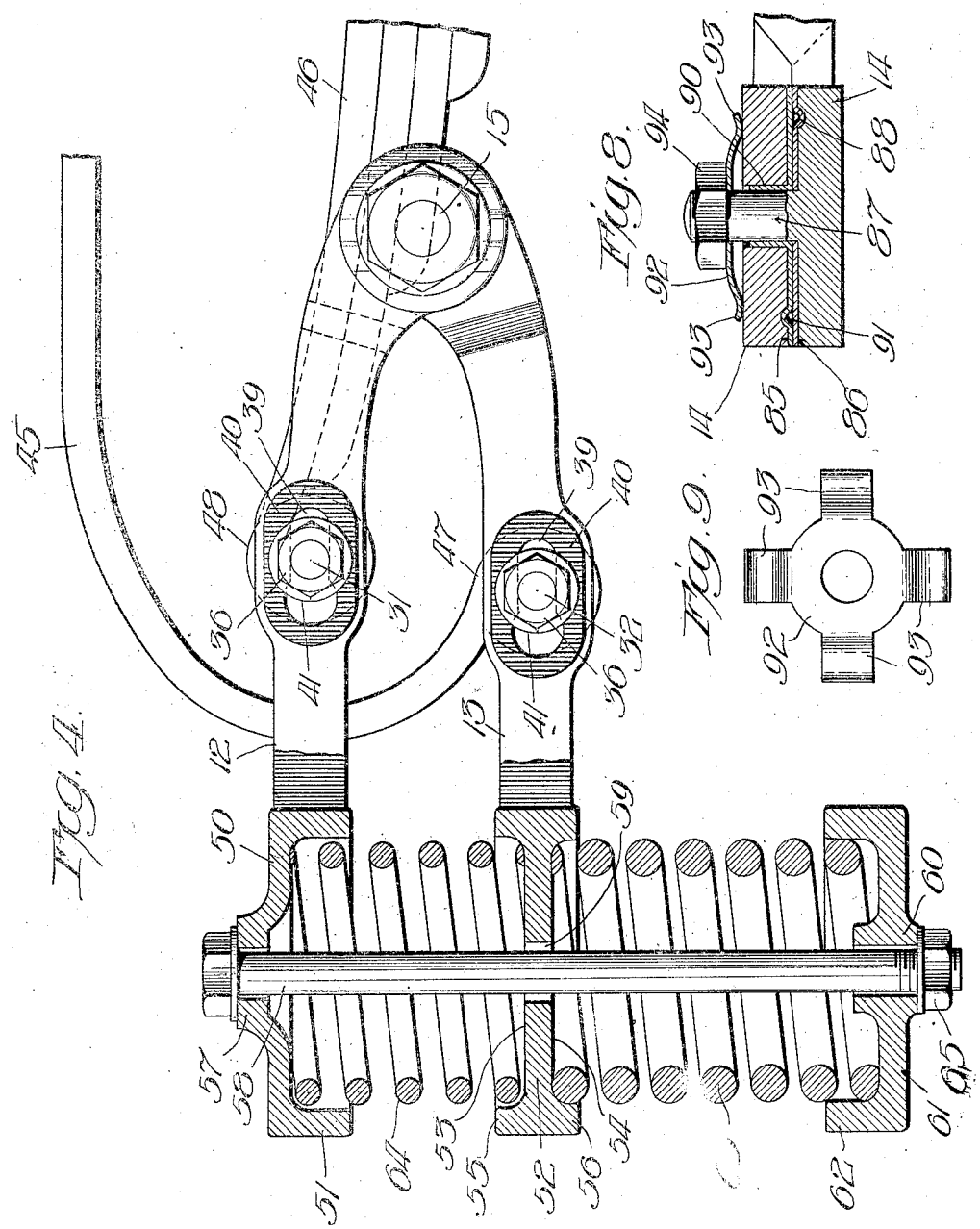
Figure 4 is a modification of the auxiliary spring device as applied to another type of springing.

In the construction shown in Figure 4, the upper and lower springing elements comprise the upper scroll member 45 and the lower elliptic member 46 of a three quarter elliptic spring. The upper and lower levers 12 and 13 are hinged together at their inner ends by the studs 15, and the connection of said levers with the eyes 47 and 48 of the upper and lower springing elements may be of the same construction as described in connection with Figures 1, 2, and 3, and similar parts bear like reference characters. The outer ends of the levers 12 and 13 are somewhat elongated to extend them past their pivots 31 and 32 and beyond the scroll spring member 45.

In the construction shown in Figure 4, the upper levers of the pairs terminate in a downwardly facing, cup shaped spring seat 50 provided with a retaining flange 51 and the lower levers of the pairs terminate in a casting 52 that is formed to provide an upwardly facing spring seat 53 and a downwardly facing spring seat 54; the respective spring seats having marginal retaining flanges 55 and 56. The spring seat 50 is provided with a centrally apertured boss 57, downwardly through which extends a tie bolt 58. Said bolt also extends through an aperture 59 in the double seated casting 52 and through the centrally apertured portion 60 of a floating spring seat 61 provided with a marginal retaining flange 62. 63 designates a coil auxiliary spring that is interposed between the spring seat 61 and the downwardly facing spring seat 54 of the casting 52 and is retained at its ends by the flanges 56 and 62. 64 designates a second coiled spring which acts as anti-recoil means which is interposed between the upwardly facing spring seat 53 of the casting 52 and the upper spring seat 50. The nut 65 of the bolt 58 affords means whereby a desired normal compression stress may be exerted on the springs 63 and 64. The spring 64 will be of such strength that the confining action of the bolt 58, common to both said springs, will place the anti-recoil spring under less normal stress than the auxiliary spring.

In the construction last described the manner of connecting the auxiliary and anti-recoil levers to the spring elements is generally the same as that illustrated in Figures 1, 2, and 3. By reason of the fact that the scroll of the upper springing element 45 is curved around and beneath the lower springing element 46, it will be observed that when the springing is loaded the spring seats carried by the outer ends of the levers move away from each other instead of towards each other. For this reason the auxiliary spring 63 is placed between the spring seat casting 52 and the lower floating spring seat 61 so as to be placed under compression between the central spring seat casting 52 and the lower spring seat 61. Said auxiliary spring 63 absorbs the minor road shocks, and, after the main springing element begins to flex, acts with the latter to take the severer road shocks. The spring 64 is placed under such compression that compression thereon is not entirely relieved when the springing is subject to heavy shocks and said spring 64 serves when the spring seat 50 and spring seat casting 52 are brought together in the restoration of the springing to normally absorb the recoil or rebound of the spring.

Figure 5:
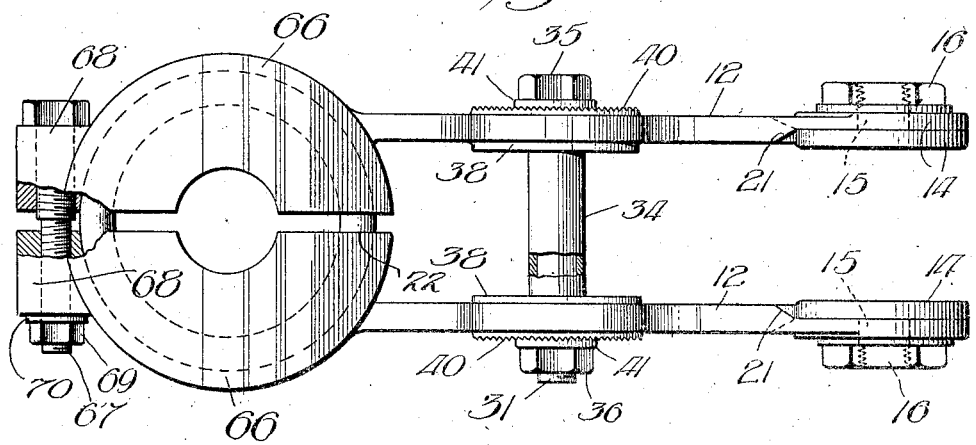
Figure 5 is a further modification, showing an auxiliary device adjustable to springing elements of different widths.

In the construction shown in Figure 5, the details of the levers, the manner of fitting the same to the auxiliary springs, the manner of hinging them at their inner ends, and the manner of pivoting them to the springing elements are the same as hereinbefore described. Said structure differs from that shown in Figure 1 in that the upper and lower spring seats, instead of being made an integral casting or forging, are laterally divided into two parts 66, each lateral part being cast to or fixed rigidly on a single arm of a pair. The purpose of making the spring seats of two lateral parts is to provide means whereby the device may be adjusted to springs of different widths. This adjustment may be effected by means of the bolts 31, 32 and right and left hand threaded adjusting screws 67 that are threaded through apertured lugs 68, one rigid with each spring seat part 66. Preferably, and as herein shown, the two threads of the adjusting bolts are cut on portions of bolts having different diameters so as to facilitate the assembling of the bolts in the lugs. The bolts are locked in place by nuts 69 and locking washers 70.

Figure 6:
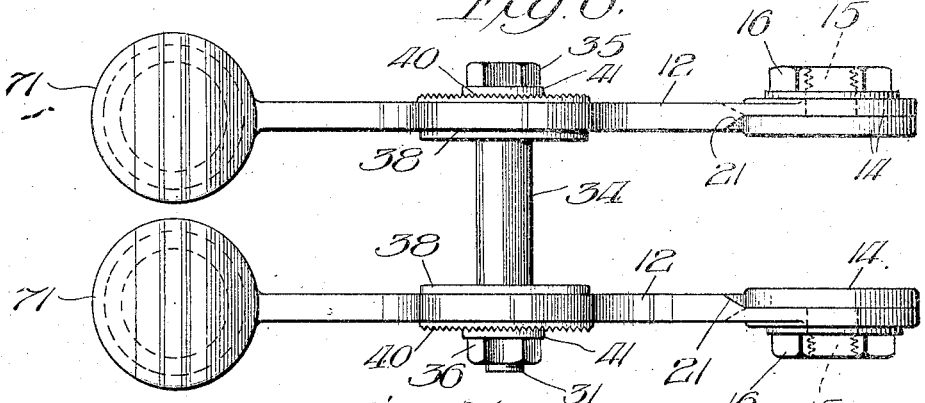
Figure 6 is a further modification, showing a duplex auxiliary spring device.

In the construction shown in Figure 6, each of the levers is provided with an individual spring seat 71 so that, instead of employing a single auxiliary spring, two separate auxiliary springs are used, each interposed between two opposing pairs of seats 71.

In all other respects the construction shown in Figures 5 and 6 may be the same as that illustrated in Figures 1, 2, and 3. Moreover, the adjustable and duplex feature of the construction may be employed in the form of device illustrated in Figure 4.

Figure 7:
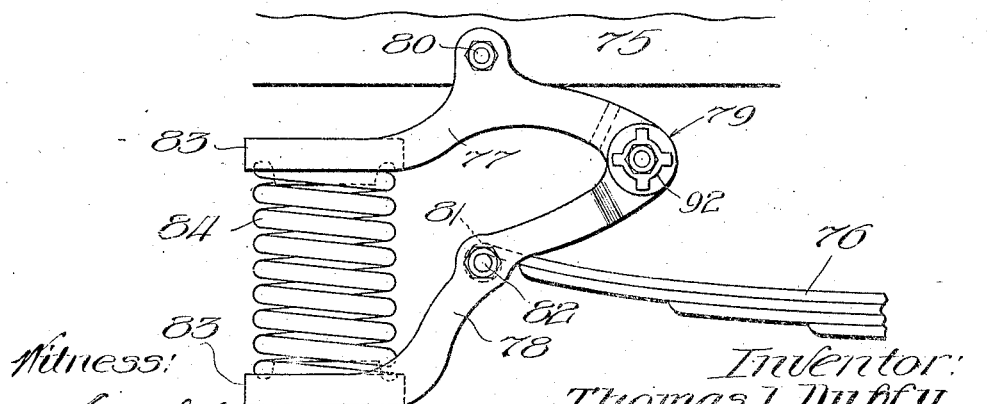
Figure 7 illustrates the application of the invention to a front spring.

In Figure 7 is shown the adaptation of my invention to the front springing of a vehicle. As therein shown, 75 designates a portion of the vehicle body and 76 designates the semi-elliptical main spring. 77, 78 designates respectively upper and lower levers which are hinged together at 79 and are pivoted, one to the body 75 by the pivot pin 80, and the other to the eye 81 of the riding spring 76, by the pivot pin or bolt 82. Between seats 83, 83 at the rear ends of said levers is interposed an auxiliary coiled spring 84 which serves as the shock absorbing element of the structure.

In the construction shown in Figure 7, the anti-recoil element thereof, instead of following the anti-recoil springs of Figures 1, 2, and 4, may take the form of the friction element shown in Figures 8 and 9. As therein shown, friction washers 85, 86 are interposed between the heads 14 of the levers 77 and 78, said washers surrounding the hinge stud 87 that is integral with one of the heads and passes through the other head. The washer 86 may be fixed to one of the heads by one or more spurs 88. The washer 85 has flat friction contact with the washer 86, and is also provided with a cylindrical boss 90 which surrounds and has frictional contact with the stud 87 or with the opening in the head 14 or both. Said washer 85 is fixed, as by the spur 91, to one of the lever heads 14. The friction faces of the washers 85, 86 may be forced together by any suitable means that will take up wear between said parts. As shown, such frictional engagement is effected by means of a suitably formed spring washer 92, having an outwardly bowed, disc shaped center and peripheral bearing fingers 93 and is interposed between the nut 94 of the hinge stud 87 and the head 14 of one of the levers.

In Figures 10 and 11 is shown a form of linkage or shackle embracing upper and lower pairs of levers 95, 96, respectively, which are hinged together at 97 and said levers are connected to the springing elements 98, 99 by hinge joints 100. Auxiliary springs 101 may be interposed between seat brackets 102 that are carried by the outer ends of the pivot bolt 100 and extend laterally therefrom, and anti-recoil springs 103 may be interposed between said seat brackets and the heads and nuts of the bolts 104 which extend through said springs and brackets and serve to tie the auxiliary and anti-recoil springs together, as best shown in Figure 11.

In Figures 12 and 13 are shown a further modification of auxiliary spring and shackles which constitute, in a manner, a duplication of the linkage shown in Figures 10 and 11, but with a modified arrangement of auxiliary and anti-recoil springs. As shown in said figures, there are four pairs of levers or links 105, 106, 107, 108, which are relatively arranged to produce a diamond shaped linkage, with two pairs extending inwardly and the other two pairs extending outwardly from the bolts 109, 110 by which their diverged ends are pivoted to the eyes of the springing members 111, 112. The levers of each pair are hinged together at their converging ends by hinge studs 113, 114. 115, 115 designate opposed, axially aligned, horizontal auxiliary tensile springs that are stretched between brackets 116 carried by the ends of the hinge bolts 113, 114 and a central plate 117. Stretched between said central plate 117 and brackets 118 carried by the outer end of the pivot bolts 109, 110 are opposed, vertically aligned tensile springs 119. It will be understood that there are two pairs of said springs 115 and 119, respectively, on each side of the linkage. In the operation of the latter arrangement the loading of the springing tends to move the pivot bolts 109, 110 towards each other and to thereby horizontally elongate the diamond shaped linkage and thus exert tension on the springs 115. The latter springs become the auxiliary springs to assist in carrying the load and absorb road vibrations, and the springs 119 which are brought under tension when the pivot bolts separate serve to check the recoil action of the springing.

It will be observed that in all the constructions described, a common structure is preserved, in that the parts of the levers 12 and 13 of Figures 1 to 6, inclusive, and the like parts of the levers 77 and 78 of Figure 7, constitute a shackle or linkage connection between the springing elements which operates to maintain such springing elements in lateral alignment, and serves also to permit free vertical movement of the springing elements, unhampered in action by frictional binding of the retaining and attaching members. One phase of the invention relates, therefore, in a broad sense, to the linkage between the springing elements, aside from a particular adaptation of an auxiliary or shock absorbing element and an anti-recoil element.

Reference in the claims to the extension of the shackle members or levers outwardly beyond and inwardly beyond the ends of the springing elements is to be taken with respect to the fore and aft direction of said elements, the parts of said levers lying inwardly beyond the ends of said elements extending towards the longitudinal center of the vehicle, and the parts outwardly beyond the ends of said elements lying exterior to the ends of said elements.

It will be furthermore understood that the invention is not limited to the particular details herein illustrated except as to claims wherein the details are specifically set forth and as imposed by the prior art, it being the intent to claim all of inherent novelty in the structures disclosed.

I claim as my invention:

1. In vehicle springs, springing elements having their outer ends terminating in the same general vertical plane, shackle members, means pivoting both said shackle members between their ends to the outer ends of said elements, said shackle members extending at their inner ends inwardly beyond the ends of said springing elements, means to hinge said shackle members together at their inner ends, said shackle members extending at their outer ends outwardly beyond said springing elements, and resilient means lying in the vertical plane of the ends of said springing elements and acted upon by the outer ends of said shackle members outwardly beyond said springing elements to oppose relative movement thereof.

2. In vehicle springs, springing elements having their outer ends terminating in the same general vertical plane, shackle members pivoted between their ends to the outer ends of said elements and extending at their inner ends inwardly beyond the ends of said springing elements and there hinged together, said shackle members extending at their outer ends outwardly beyond said springing elements, and interacting shock absorbing and anti-recoil springs lying in the vertical plane of the springing element ends and operatively associated with and acted upon by the outer ends of said shackle members.

3. In vehicle springs, springing elements, shackle members pivoted to the outer ends of said elements and hinged together inwardly beyond said ends, and shock absorbing and anti-recoil springs operatively associated with said shackle members at the rear ends thereof and lying in the vertical plane of said springing elements.

4. In vehicle springs, springing elements, levers hinged together at corresponding ends, resilient means outwardly beyond both said elements positioned to be acted upon by said levers, said levers being slotted between their ends, and a pivot bolt extending through the slots and through apertures of said springing elements, with means for locking said bolts relatively to said levers.

5. In vehicle springs, springing elements, levers hinged together by a common hinge bolt at their inner ends to swing at their outer ends symmetrically towards and from each other, opposing spring seats carried by the outer ends of said levers, an auxiliary spring between said seats, tying means acting through said seats to maintain said auxiliary spring under normal compression, and lever pivot means between said hinge and seats and substantially in the same vertical plane to connect both said levers to the outer ends of said springing elements.

6. In vehicle springs, springing elements, levers hinged together at their inner ends by a common hinge bolt, opposing spring seats at their other ends outwardly beyond the ends of said elements, an auxiliary spring interposed between said seats, tying means extending through and acting on said seats to maintain said auxiliary spring under normal compression, and pivot means between the ends of the levers and approximately in the same vertical plane to pivot them to the springing elements.

7. In vehicle springs, springing elements, levers hinged together at corresponding ends and having at their other ends outwardly beyond the ends of said elements opposing seats, an auxiliary spring acted upon by said seats, tying means extending through and acting through said seats to maintain said spring under normal compression, anti-recoil means co-operating with said auxiliary spring, and pivot means for connecting said levers between their ends to the ends of said springing elements.

8. In vehicle springs, springing elements, levers hinged together at corresponding ends and provided at their other ends outwardly beyond the outer ends of said elements with opposing seats, coiled compression shock absorbing and anti-recoil springs operative between said seats, common tying means extending between said seats to hold the springs under compression, and pivot means to connect said levers to the ends of said springing elements.

9. In vehicle springs, springing elements, levers pivoted between their ends to the corresponding ends of said springing elements and hinged together at their ends at one side of said pivot, auxiliary spring means positioned to be acted upon by said levers at the other side of said pivot, anti-recoil means cooperating with said auxiliary spring means, with one enclosing the other, and common tying means to exert normal compression on said auxiliary and anti-recoil means.

10. In vehicle springs, springing elements, levers pivoted between their ends to the corresponding ends of said springing elements and hinged together at their ends at one side of said pivot, auxiliary spring means acted upon by said levers at the other side of said pivot, anti-recoil means positioned to co-operate with said auxiliary spring means, with one enclosing the other, common tying means to exert normal compression on said auxiliary and anti-recoil spring means, and adjusting means operative on the tying means to vary the tension compression of said auxiliary and recoil means.

11. In vehicle springs, springing elements, levers pivoted between their ends to corresponding ends of said springing elements and hinged together at their ends at one side of said pivot, spring seats carried by the outer ends of said levers outwardly beyond the outer ends of said springing elements, a coiled auxiliary spring operatively interposed between said seats, anti-recoil springs within said auxiliary springs, and tying means cooperating with said springs and seats to maintain a normal compression on all said springs.

12. In vehicle springs, springing elements, levers pivoted between their ends to said springing elements and hinged together at their ends at one side of said pivot, spring seats carried by said levers at their other ends, a coiled auxiliary spring operatively interposed between said seats, coiled anti-recoil springs within said auxiliary spring, a tying bolt extending through said springs, and abutments respectively fixed to said bolt and said spring seats between which the anti-recoil springs are held under normal compression, and acting to place said auxiliary spring under normal compression.

13. In vehicle springs, springing elements, levers pivoted between their ends to said springing elements and hinged together at their ends at one side of said pivot, spring seats carried by said levers at their other ends, a coiled auxiliary spring operatively interposed between said seats, cups rigid with said seats and extending into the ends of said auxiliary spring, a tie rod extending axially through said cups and said spring and provided at its ends with shoulders, and anti-recoil springs compressed between said shoulders and the closed ends of said cups.

14. In vehicle springs, springing elements, levers pivoted between their ends to said springing elements and hinged together at corresponding ends, spring seats carried by said levers, a coiled auxiliary spring operatively interposed between said seats, cups rigid with said seats, and extending into the ends of the auxiliary spring, anti-recoil springs in said cups, tie means extending through said springs and cups, and shoulders on the tie means movable into said cups between which and the ends of the cups the anti-recoil springs are adapted to be compressed.

15. In vehicle springs, springing elements, two pairs of laterally spaced levers, one pair at each side of said elements, means whereby the levers of each pair are hinged together at their inner ends, spring seats carried by the outer ends of said levers outwardly beyond said springing elements to connect together the levers at the opposite sides of the springing elements, coiled springs operatively interposed between said spring seats, and pivot means between the ends of said levers to connect said levers to the ends of the springing elements.

16. In vehicle springs, springing elements, two pairs of laterally spaced levers, one pair at each side of the plane of said elements, means whereby the levers of each pair are hinged together at their inner ends, spring seats carried by the outer ends of said levers to connect together the levers at the opposite sides of the springing elements, coiled springs operatively interposed between said spring seats, pivot means between the ends of said levers to connect said levers to the ends of the springing elements, and means to adjust the pairs of levers towards and away from each other to adapt them to springing elements of different widths.

17. In vehicle springs, springing elements, two pairs of laterally spaced levers, one pair at each side of the plane of said elements, means whereby the levers of each pair are hinged together at their inner ends, means for pivoting said levers between their ends to the springing elements, opposed spring seats carried by the outer ends of said levers, each said seat being made of laterally separable parts, with means for adjusting them towards and from each other to adapt the levers to different width springing elements, and an auxiliary spring operatively interposed between said seats.

18. In vehicle springs, springing elements, two pairs of laterally spaced levers, one pair at each side of the plane of said elements, means whereby the levers of each pair are hinged together at their inner ends, means for pivoting said levers between their ends to the springing elements, opposed spring seats carried by the outer ends of said levers, each said seats being made of laterally separable parts, threaded lugs on said parts, a right and left hand threaded screw engaging said threaded lugs, and an auxiliary spring operatively interposed between said seats.

19. Auxiliary and anti-recoil spring device comprising a pair of levers hinged together at one end of the pair, spring seats carried by the other end thereof, a coiled compression spring operatively interposed between said seats, coiled anti-recoil springs at the ends of and within said auxiliary spring, means to maintain normal compression on all said springs, and pivot means to connect said levers between the ends thereof to the springing elements of vehicles.

In testimony whereof I claim the foregoing as my invention, I hereunto append my signature at Chicago, Illinois, this thirtieth day of November, 1918.

THOMAS I. DUFFY.